United States Patent [19]
Van Der Voort

[11] 3,819,579
[45] June 25, 1974

[54] UNSYMMETRICALLY ALKYL DISUBSTITUTED POLYPHENYLENE ETHERS

[75] Inventor: Henricus G. P. Van Der Voort, Amsterdam, Netherlands

[73] Assignee: Shell Oil Company, New York, N.Y.

[22] Filed: Sept. 29, 1971

[21] Appl. No.: 184,953

Related U.S. Application Data

[60] Division of Ser. No. 824,292, May 13, 1969, and a continuation-in-part of Ser. No. 680,991, Nov. 6, 1967, abandoned.

[52] U.S. Cl.............. 260/47 ET, 252/52 R, 260/49
[51] Int. Cl............................................ C08g 23/18
[58] Field of Search................................ 260/47 ET

[56] References Cited
UNITED STATES PATENTS

| | | | |
|---|---|---|---|
| 3,236,807 | 2/1966 | Stamatoff | 260/47 |
| 3,306,875 | 2/1967 | Hay | 260/47 |
| 3,402,143 | 9/1968 | Hay | 260/47 |
| 3,409,552 | 11/1968 | Wilgus | 252/52 |
| 3,546,170 | 12/1970 | Hay | 260/47 |

*Primary Examiner*—Melvin Goldstein
*Attorney, Agent, or Firm*—Henry C. Geller

[57] ABSTRACT

Lubricant compositions containing as an additive a linear alkyl substituted polyphenylene polymer. The phenylene groups may be connected directly together or separated by hydrocarbyl or hetero atoms, e.g., polyphenylene ethers.

5 Claims, No Drawings

UNSYMMETRICALLY ALKYL DISUBSTITUTED POLYPHENYLENE ETHERS

Said U.S. Pat. application Ser. No. 824,292 is a continuation-in-part of U.S. Pat. Ser. No. 680,991, filed Nov. 6, 1967, now abandoned.

BACKGROUND OF THE INVENTION

The invention relates to novel lubricant compositions with improved properties.

It is known in the art to add certain compounds having detergent or thickening properties to lubricants, to improve the quality thereof. In the past many compounds have been proposed for this purpose, most of them being polymeric compounds which may or may not contain polar groups. A drawback of most of these compounds is that their thermal stability is poor. If the lubricant in which they are incorporated is exposed to high temperatures, they break down, thereby either partially or completely losing their beneficial effectiveness. In those cases where the lubricants are utilized under circumstances in which they are exposed to high temperatures, e.g., as lubricating oils for combustion engines, it is desirable that the additives incorporated in the lubricants possess a sufficiently high thermal stability that their activity is maintained at high temperatures.

A class of compounds has now been found which, in addition to improving the quality of lubricants in which they are incorporated, possess a high thermal stability. These compounds are linear polymers of the general formula:

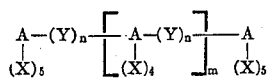

wherein A represents benzene nuclei, X represents monovalent substituents and Y represents metal-free bivalent radicals separating the benzene nuclei by one atom; in which $n = 1$ and $m$ 8, and in which the group Y contains at least two carbon atoms if this group is a hydrocarbon group.

In particular this invention relates to novel lubricant compositions comprising one or more lubricants and one or more linear polymers of the general formula:

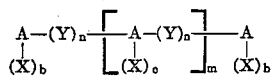

wherein A represents a benzene nuclei, Y represents a metal-free bivalent radical selected from the group consisting of -O-, -NH-, -NR-, -S-, -SO- and -SO$_2$-, wherein R is a group having from 1 to 60 carbon atoms and from 0 to 10 nitrogen atoms, $b$ is an integer from 2 to 5, $c$ is an integer from 2 to 4, $m$ is at least 8, $n$ is 0 to 1, and X is selected from the group consisting of C$_{1-30}$ alkyl, OH, Cl, NO$_2$, SO$_3$H, -B, -SO$_2$B and -ZB, wherein B represents an amine group having from 1 to 10 nitrogen atoms and from 0 to 60 carbon atoms, and Z represents a carbonyl hydrocarbyl group having from 1 to 20 carbon atoms and from 1 to 2 carbonyl radicals, at least one of which is attached to the amine group B.

The X groups present in each of the benzene nuclei of the polymer molecules may be the same or different substituents. This means that the X groups present as substituents in one benzene nucleus of the polymer can differ from those present in another benzene nucleus of the same polymer molecule, and that the X groups present as substituents in a particular benzene nucleus can differ among themselves. Examples of suitable monovalent nitrogen substituents include amines, polyamines, amides, imides and the like including -C ≡ N groups. In addition to these groups and the other X substituents mentioned in the above formula, other monovalent substituents can also be utilized, for example, bromine, aryl and alkaryl groups, -OR$_1$, -COOR$_1$, -CHO and -COR$_1$ groups, sulfur containing groups such as -SH and SR$_1$, and phosphorus containing groups such as -PO$_3$H$_2$, wherein R$_1$ is a hydrocarbon group, preferably an aliphatic group having from 1 to 30 carbon atoms. It is also possible that two groups present as monovalent substituents in a benzene nucleus may combine to form a second ring in addition to the benzene ring already present.

Groups other than oxygen may be present between the benzene nuclei of the polymer molecules and may be the same or different metal-free bivalent radicals. This means that a group present a metal-free bivalent radical between two benzene nuclei of a polymer molecule may differ from a group present between two other benzene nuclei of the same polymer molecule.

If there is a group present between two benzene nuclei, there may be only one atom connecting the two benzene nuclei to one another. This, however, does not mean that the group may only contain one atom, since the atom connecting the two aromatic carbon atoms of the benzene nuclei to one another may carry substituents or side chains.

As examples of metal-free bivalent radicals which can be used in the general formula may be mentioned hydrocarbon groups, such as alkylene and arylalkylene groups, oxygen and oxygen-containing groups, such as -CO- groups, nitrogen-containing groups, such as -NH- and -NR- groups wherein R is a radical having from 1 to 60 carbon atoms and from 0 to 10 nitrogen atoms, sulfur-containing groups, such as -S-, -SO- and -SO$_2$- groups, and phosphorus-containing groups, such as R-P→O groups. Of the foregoing groups, oxygen and -NR- are especially preferred.

The value of n in the aforementioned formula may be 0 or 1. If $n = 0$ for the entire polymer, the polymer molecules are composed of benzene nuclei linked together by simple carbon-carbon linkages. If $n = 1$ for the entire polymer there is a group present between any two benzene nuclei of the polymer molecules. It is, however, also possible that the value of $n$ varies between 0 and 1 in the polymer molecules. In that case the benzene nuclei are partly linked together by simple carbon-carbon linkages between aromatic carbon atoms of the benzene nuclei and partly by metal-free bivalent groups.

Lubricant compositions according to the invention containing polymers in which $n = 1$ are preferred.

The carbon atoms of the benzene nuclei in the polymer molecules which are connected, either directly or via oxygen to carbon atoms of other benzene nuclei may be in ortho, meta or para position to each other. Dependent on the positions of these carbon atoms the benzene nuclei in question may also be described as being in ortho, meta or para position to each other. Polymers in which all benzene nuclei connected with two other benzene nuclei are in the same position to each other, as well as polymers in which part of these benzene nuclei are in one position and the rest is in one or both of the two other possible positions may be used for the preparation of the present lubricant compositions.

However, according to the invention, lubricant compositions containing polymers in which the benzene nuclei are in the same position to each other, i.e., para position, are preferred.

The molecular weight of the polymers which may be applied for the preparation of lubricant composition according to the invention may vary within wide limits, provided that the number of A groups amounts to at least ten. In general polymers with a molecular weight between 1,000 and 1,000,000 can be used; however, polymers with a molecular weight between 5,000 and 500,000 are preferred, particularly those having a molecular weight of 5,000 to 100,000. When polymers with relatively high molecular weights are utilized for the preparation of lubricant compositions according to the invention, preference is given to polymers in which at least part of the X groups are alkyl groups with from 6 to 30 carbon atoms. Preference is given to polyphenylene ethers wherein the alkyl groups contain partly 6–30 carbon atoms and partly less than 6 carbon atoms, in particular polyphenylene ethers comprising either methyl and octyl groups or methyl and hexadecyl groups. This is especially of importance if the lubricant is a mineral lubricating oil.

The invention relates in particular to lubricating compositions containing as linear polymers polyalkyl substituted polyphenylene polyethers, more in particular poly(para-dialkyl phenylene)polyethers. Polymers of this type may be represented by the formula

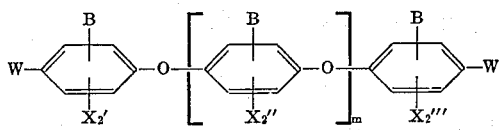

wherein $X'$, $X''$ and $X'''$ are alkyl radicals of 1–30 carbon atoms, W is H or OH, m is at least 8 and B is a Cl, $NO_2$, $SO_3H$, or a poly-nitrogen containing amine, imide, sulfoamide or amide group. Polymers of this type may be prepared by oxidative coupling of phenols, for example, with oxygen or an oxygen-containing gas and in the presence of a catalyst. As catalysts, complexes of copper compounds and nitrogen compounds are very suitable.

Very favorable results have been obtained by application of polyphenylene polyethers containing no further hetero atoms in their molecules except the oxygen atoms between the benzene nuclei and possible one or two terminal hydroxyl groups. Examples of these polymers are polymers prepared by oxidative coupling of one or more 2,6-dialkylphenols, such as polymers prepared by oxidative coupling starting from:

1. 2-methyl-6-hexadecyl phenol,
2. 2-methyl-6-octyl phenol,
3. a mixture of 2,6-dimethyl phenol and 2-methyl-6-hexadecyl phenol, preferably in a mol. ratio of 2:1 to 1:2,
4. a mixture of 2,6-dimethyl phenol and 2-methyl-6-octyl phenol,
5. a mixture of 2,6-dimethyl phenol and 2-methyl-6-($C_{14}$–$C_{18}$) alkyl phenol,
6. a mixture of 2,6-dimethyl phenol and 2-methyl-6-($C_{22}$–$C_{28}$) alkyl phenol,
7. a mixture of 2-methyl-6-hexadecyl phenol and 2,3,5,6-tetramethyl phenol.

The incorporation of these polymers possessing high thermal and oxidative stabilities in mineral lubricating oils, improves the viscometric and detergent properties of these oils as will be shown below.

As examples of suitable polyphenylene polyethers containing in addition to the oxygen atoms between the benzene nuclei and possibly one or two thermal hydroxyl groups, other hetero atoms, may be mentioned:

8. polyphenylene polyethers containing sulfonic acid groups, prepared by treating a polyphenylene polyether obtained by oxidative coupling of a mixture of 2,6-dimethyl phenol and 2-methyl-6-hexadecyl phenol, with chlorosulfonic acid,
9. polyphenylene polyethers containing nitro groups, prepared by treating a polyphenylene polyether obtained by oxidative coupling of a mixture of 2,6-dimethyl phenol and 2-methyl-6-hexadecyl phenol, with concentrated nitric acid,
10. polyphenylene polyethers containing chlorine, obtained by oxidative coupling of a mixture of 2,6-dimethyl phenol, 2-methyl-6-hexadecyl phenol and 2-methyl-6-chloro phenol,
11. polyphenylene polyethers containing nitro groups, obtained by oxidative coupling of a mixture of 2,6-dimethyl phenol, 2-methyl-6-hexadecyl phenol and 3-nitro-2,6-dimethyl phenol.

Nitrogen-containing polyphenylene ethers can be prepared employing the aforementioned oxidative coupling techniques, the nitrogen containing groups being introduced into the polymer as a bivalent linking radical or as a ring substituent either directly or indirectly. Via the direct route, the polyphenylene ethers are prepared by oxidative coupling of one or more phenols; at least part of which phenols carry one or more alkyl groups and at least part of which phenols carry one or more poly-nitrogen groups comprising at least one amino-nitrogen atom. Via the indirect route, the polyphenylene ethers are prepared by oxidative coupling of one or more phenols which do not have poly-nitrogen groups, but part of which do carry one or more alkyl groups, and after-treatment of the polyphenylene ethers thus obtained, whereby one or more of said poly-nitrogen groups are introduced into at least part of the benzene nuclei.

The poly-nitrogen groups present as substituents in at least part of the benzene nuclei of the polyphenylene ethers according to the invention preferably consist either exclusively of carbon, hydrogen and nitrogen atoms or contain in addition to these atoms, oxygen atoms present in one or more carbonyl and/or carboxy groups. Preference is given to polyphenylene ethers according to the invention wherein the nitrogen atoms present in the poly-nitrogen groups are derived from one or more polyamines, in particular aliphatic polyamines having from 2 to 10 nitrogen atoms and from 1 to 60, preferably 1 to 40, carbon atoms. Such aliphatic amines can be represented by the formula $$R_2R_3N[(CH_2)_pNH]_qH$$

wherein $p$ is an integer of from 2 to 6, $q$ is an integer from 1 to 10 and $R_2$ and $R_3$ are selected from the group consisting of H and $C_{1-8}$ alkyl.

Examples of suitable aliphatic polyamines are polyalkylene polyamines, such as polyethylene polyamines, polypropylene polyamines and polybutylene polyamines. Examples of polyethylene polyamines are diethylene-triamine, triethylenetetramine, tetraethylenepentamine, pentaethylene-hexamine and the higher polyethylene polyamines with a molecular weight above 1,000. Other suitable aliphatic polyamines are, for instance, ethylene-diamine, N,N-dimethylpropane-1,3-diamine and hexamethylenetetramine. Polyphenylene wherein the nitrogen atoms present in the poly-nitrogen groups are derived from N,N-dimethylpropane-1,3-diamine or tetraethylenepentamine are preferred.

Very good results may be obtained if the preparation of the nitrogen-containing polyphenylene ethers is carried out as follows:

1. By oxidative coupling of one or more 2,6-dialkylphenols and after-treatment of the polyphenylene ethers thus obtained with one or more polyamines.
2. By oxidative coupling of one or more 2,6-dialkylphenols and after-treatment of the polyphenylene ethers thus obtained, first with one or more anhydrides of olefinically unsaturated dicarboxylic acids having from 4 to 10 carbon atoms and subsequently with one or more polyamines.
3. By oxidative coupling of one or more 2,6-alkylphenols with one or more 2-alkyl-6-alkenylphenols and after-treatment of the polyphenylene ehters thus obtained first with one or more anhydrides of olefinically unsaturated dicarboxylic acids and subsequently with one or more polyamines.

An example of a very suitable 2-alkyl-6-alkenylphenol for the preparation of polyphenylene ethers according to the method mentioned under (3) is 2-methyl-6-allylphenol. A particularly advantageous anhydride reactant for use in the preparations outlined in (2) and (3) is maleic anhydride.

4. By oxidative coupling of one or more 2,6-dialkylphenols with one or more 2,6-dialkyl-4-alkoxycarbonylphenols and after-treatment of the polyphenylene ethers thus obtained with one or more polyamines. A very suitable 2,6-dialkyl-4-alkoxycarbonylphenol for the preparation of polyphenylene ethers according to the aforementioned method is 2,6-dimethyl-4-butoxycarbonylphenol.
5. By oxidative coupling of one or more 2,6-dialkylphenols with one or more 2-alkyl-6-alkoxycarbonylalkylphenols and after-treatment of the polyphenylene ethers thus obtained with one or more polyamines. 2-Alkyl-6-alkoxycarbonylalkylphenols which are especially useful for the preparation of polyphenylene ethers according to this method are 2-$C_{1-30}$alkyl-6-$C_{18}$-alkoxycarbonyl$C_{1-1-9}$alkylphenols. An example of such a phenol is 2-methyl-6-(1-methyl-9-butoxycarbonylnonyl)-phenol.
6. By oxidative coupling of one or more 2,6-dialkylphenols and after-treatment of the polyphenylene ethers thus obtained first with one or more chlorinating agents and subsequently with one or more polyamines. A very good chlorinating agent for this purpose is $SO_2Cl_2$.

Examples of 2,6-dialkylphenols which are particularly suitable for the preparation of polyphenylene ethers according to the methods mentioned under (1)-(6) are 2-methyl-6-octylphenol and mixtures of 2,6-dimethylphenol and 2-methyl-6-hexadecylphenol.

As polyamines applicable for the preparation of polyphenylene ethers according to the methods as described under (1)-(6), N,N-dimethyl-propane-1,3-diamine and tetraethylenepentamine are very suitable.

Specific examples of nitrogen-containing polyphenylene polymers are the following:

1. Polyphenylene ethers prepared by oxidative coupling of 2,6-dimethylphenol, 2-methyl-6-hexadecylphenol and 2-methyl-6-allylphenol in a molar ratio of 1:1:0.5 and reaction of the polyphenylene ether thus obtained (Polymer 1), first with maleic anhydride (giving Polymer 2) and subsequently with N,N-dimethylpropane-1,3-diamine.
2. Polyphenylene ethers prepared by oxidative coupling of 2,6-dimethylphenol, 2-methyl-6-hexadecylphenol and 2-methyl-6-allylphenol in a molar ratio of 1:1:0.25 and reaction of the polyphenylene ether thus obtained (Polymer 3), first with maleic anhydride (giving Polymer 4) and subsequently with tetraethylenepentamine.
3. Polyphenylene ethers prepared by oxidative coupling of 2,6-dimethylphenol, 2-methyl-6-hexadecylphenol and 2-methyl-6-(1-methyl-9-butoxycarbonylnonyl)phenol in a molar ratio of 1:1:0.4 and reaction of the polyphenylene ether thus obtained (Polymer 5), with N,N-dimethylpropane-1,3-diamine.
4. Polyphenylene ethers prepared by oxidative coupling of 2,6-dimethylphenol and 2-methyl-6-hexadecylphenol in a molar ratio of 1:1 and reaction of the polyphenylene ether thus obtained (Polymer 6), first with $SO_2Cl_2$ (giving Polymer 7) and subsequently with tetraethylenepentamine.
5. Polyphenylene ethers prepared by oxidative coupling of 2,6-dimethylphenol, 2-methyl-6-hexadecylphenol and 2,6-dimethyl-4-butoxycarbonylphenol in a molar ratio of 1:1:0.1 and reaction of the polyphenylene ether thus obtained (Polymer 8), with N,N-dimethylpropane-1,3-diamine.
6. Polyphenylene ethers prepared by reaction of Polymer 6 (see under (4)) with tetraethylenepentamine.
7. Polyphenylene ethers prepared by oxidative coupling of 2-methyl-6-octylphenol and reaction of the polyphenylene ether thus obtained (Polymer 9) with tetraethylenepentamine.
8. Polyphenylene ethers prepared by reaction of Polymer 6 (see under (4)) first with maleic anhydride (giving Polymer 10) and subsequently with tetraethylenepentamine. The polyphenylene ethers 1-10 obtained as intermediate products in the preparation of polyphenylene ethers according to the invention are novel compounds as well.

If the polyphenylene ethers according to the invention are used as lubricant additives, the lubricants wherein they are incorporated may be mineral lubricating oils of various viscosities, but also synthetic lubricating oils or lubricating oils containing fatty oils. They may also be incorporated in lubricating greases. The present polyphenylene ethers are especially of importance for improving the properties of mineral lubricating oils or mixtures thereof.

The polyphenylene ethers may be added to the lubricants as such or in the form of a concentrate obtained, for instance, by mixing the polymers with a small quantity of oil. The concentration of the present polyphenylene ethers in the lubricants may vary within wide limits. In general, the desired improvement of the properties is achieved when the added quantities amount to from 0.1 to 10 percent w and in particular from 0.5 to 5 percent w, but in some cases it may be advisable to apply quantities larger than those mentioned above, for instance, when the lubricant is used as lubricating oil in diesel engines in which severe fouling takes place.

If the present polyphenylene ethers are used as lubricant additives, the lubricants may, in addition to the polyphenylene ethers, contain other additives, such as antioxidants, detergent additives, viscosity-increasing additives, VI improvers, anti-corrosives, anti-foaming agents, agents for improving the lubricating effect, and other substances which are generally added to lubricants.

Polyphenylene ethers according to the invention are also very suitable as additives for fuels, in particular gasolines. Gasolines containing the present polyphenylene ethers are capable of very effectively counteracting and/or preventing fouling of the carburetor and the inlet system.

The invention will now be elucidated with the aid of the following examples. These are exemplary only and are not to be construed as defining the operative limits of the invention.

EXAMPLES

A copolymer of 2,6-dimethyl phenol and 2-methyl-6-hexadecyl phenol (molar ratio 2:1) was obtained as follows:

A copper-pyridine complex was prepared by treating a mixture of 400 ml nitrobenzene, 200 ml pyridine and 4.0 g cuprous chloride with oxygen at 20°C for 20 minutes.

To the catalyst solution thus obtained a solution of 80 g 2,6-dimethyl phenol and 10 g 2-methyl-6-hexadecyl phenol in 400 ml nitrobenzene was added gradually. Oxygen was introduced while stirring and the temperature was kept at 30°C by cooling. After 40 minutes the reaction mixture was poured into methanol acidified with hydrochloric acid thereby precipitating the polymeric reaction product. The precipitated polymer was dissolved in benzene and the benzene solution washed with aqueous hydrochloric acid after which the polymer was precipitated once more. For further purification the polymer was dissolved in isooctane and the solution dialysed through a rubber membrane.

After evaporation of the isooctane solution 155 g of a copolymer of 2 mol 2,6-dimethyl phenol and 1 mol 2-methyl-6-hexadecyl phenol having a molecular weight of 16,800 was obtained (Polymer I).

A number of other polyphenylene polyethers were prepared in substantially the same manner as described for Polymer I.

The polymers are as follows:

Polymer II: Copolymer of 4 mol 2,6-dimethyl phenol and 1 mol 2-methyl-6-hexadecyl phenol having a molecular weight of 17,700.

Polymer III: Copolymer of 1 mol 2,6-dimethyl phenol and 1 mol 2-methyl-6-hexadecyl phenol having a molecular weight of 32,000.

Polymer IV: Copolymer of 1 mol 2,6-dimethyl phenol and 1 mol 2-methyl-6-hexadecyl phenol having a molecular weight of 28,500.

Polymer V: Copolymer of 1 mol 2,6-dimethyl phenol and 4 mol 2-methyl-6-hexadecyl phenol having a molecular weight of 22,400.

Polymer VI: Copolymer of 1.6 mol 2,6-dimethyl phenol and 1 mol 2-methyl-6-hexadecyl phenol having a molecular weight of 27,000.

Polymer VII: Copolymer of 1 mol 2,6-dimethyl phenol and 1 mol 2-methyl-6-octyl phenol having a molecular weight of 19,700.

Polymer VIII: Copolymer of 1 mol 2,6-dimethyl phenol and 1 mol 2-methyl-6-($C_{22}$–$C_{28}$) alkyl phenol having a molecular weight of 27,500.

Polymer IX: Copolymer of 1 mol 2,6-dimethyl phenol and 1 mol 2-methyl-6-($C_{14}$–$C_{18}$)alkyl phenol.

Polymer X: Copolymer of 1 mol 2-methyl-6-hexadecyl phenol and 1 mol 2,3,5,6-tetramethyl phenol.

Polymer XI: Homopolymer of 2-methyl-6-hexadecyl phenol having a molecular weight of 21,200.

Polymer XII: Homopolymer of 2-methyl-6-octyl phenol having a molecular weight of 16,300.

Polymer XIII: Polymer containing sulfonic acid groups, prepared by treating a copolymer of 1 mol 2,6-dimethyl phenol and 1 mol 2-methyl-6-hexadecyl phenol, with chloro sulfonic acid. Sulfur content of the polymer was 0.39 percent w.

Polymer XIV: Polymer containing nitro groups, prepared by treating a copolymer of 1 mol 2,6-dimethyl phenol and 1 mol 2-methyl-6-hexadecyl phenol with concentrated nitric acid. Molecular weight of the polymer was 25,000; nitrogen content was 3.48 percent w.

Polymer XV: Chlorine-containing terpolymer of 1 mol 2,6-dimethyl phenol, 1 mol 2-methyl-6-hexadecyl phenol and 1 mol 2-methyl-6-chloro phenol. Chlorine content of the polymer was 3.26 percent w.

Polymer XVI: Nitro groups containing terpolymer of 1 mol 2,6-dimethyl phenol, 1 mol 2-methyl-6-hexadecyl phenol and 1 mol 3-nitro-2,6-dimethyl phenol having a molecular weight of 9,950. Nitrogen content of the polymer was 1.61 percent w.

Eight polyphenylene ethers containing poly-nitrogen groups were prepared as follows:

Polymer XVII:

A copper pyridine complex was prepared by treating a mixture of 4.0 g cuprous chloride, 280 ml pyridine and 400 ml nitrobenzene with oxygen at 20°C for 30 minutes with stirring. To the catalyst solution thus obtained a solution of 67 g 2,6-dimethylphenol, 183.5 g 2-methyl-6-hexadecylphenol and 41.5 g 2-methyl-6-allylphenol (molar ratio 1:1:0.5) in 400 ml toluene was added at 30°–32° C over a period of 1.5 hours with stirring in an oxygen medium. The mixture was stirred at 20° C for a further 20 hours in the oxygen medium and then poured into methanol acidified with hydrochloric acid. The precipitated polymer was taken up in isooctane and the solution washed successively with dilute hydrochloric acid and dilute ammonia. The isooctane solution was dialysed through a rubber membrane for 24 hours, and the residue evaporated and taken up in benzene. After precipitation of the polymer with the aid of methanol and air-drying of the precipiatate, 252 g of a terpolymer of 2,6-dimethylphenol, 2-methyl-6-hexadecylphenol and 2-methyl-6-allylphenol was obtained, having a molecular weight $\overline{M}_n = 27,000$.

To 74 g of this terpolymer in 75 g decalin six grams of maleic anhydride were added under nitrogen. The mixture was brought to 190° C with stirring and kept at this temperature for 20 hours, after cooling the mixture was diluted with one liter of benzene and filtered. After precipitating twice with the aid of methanol, 72 g polymer was obtained, having a molecular weight $\overline{M}_n = 24,100$.

To 75 g of this polymer in 30 g decalin fifteen grams of N,N-dimethyl-1,3-diaminopropane in 15 g decalin were added at 100° C under nitrogen. The temperature of the mixture was brought to 190° C and maintained for 18 hours with stirring.

The mixture was taken up in benzene, filtered, and the polymer precipitated with the aid of methanol. Product: 62 g polymer with a molecular weight $\overline{M}_n = 16,800$ and a nitrogen content of 1.0 percent w.

Polymer XVIII:

A copper-pyridine complex was prepared by treating a mixture of 4.0 g cuprous chloride and 375 ml pyridine with oxygen at 20° C for 30 minutes with stirring. To the catalyst solution thus obtained a solution of 99.9 g 2,6-dimethylphenol, 269.4 g 2-methyl-6-hexadecylphenol and 30.8 g 2-methyl-6-allylphenol (molar ratio 1:1:0.25) in 500 ml toluene was added at 30°-32° C over a period of 1.5 hours with stirring in an oxygen medium. After addition of 300 ml toluene the mixture was stirred at 20° C for a further 20 hours in the oxygen medium. After dilution with an equal volume of isooctane the mixture was washed successively with dilute hydrochloric acid, dilute ammonia and water. The isooctane solution was dialysed through a rubber membrane for 24 hours, and the residue evaporated and taken up in benzene. After precipitation of the polymer with the aid of methanol and air-drying of the precipitate, 308 g of a terpolymer of 2,6-dimethylphenol, 2-methyl-6-hexadecylphenol and 2-methyl-6-allylphenol was obtained, having a molecular weight $\overline{M}_n = 38,000$.

To 100 g of this terpolymer in 850 g xylene and 500 g benzene, 6.75 g of maleic anhydride were added under nitrogen. The mixture was gently warmed until a temperature of 130°C had been reached in two hours' time, the solvent being distilled off. The mixture was washed out with water, and the polymer precipitated with methanol and air-dried. Product: 98 g polymer having a molecular weight $\overline{M}_n = 36,500$.

95 g of this polymer in 750 g xylene was added with stirring under nitrogen to a solution of 25 g tetraethylenepentamine in 500 ml decalin which had previously been brought to 50°C. After the xylene had been distilled off, the mixture was kept with stirring at 190° C for 2 hours. After cooling and dilution with benzene the mixture was washed out with water. The polymer was isolated by precipitation with methanol. This precipitation was repeated twice. Product: 92 g polymer with a molecular weight $\overline{M}_n = 30,500$ and a nitrogen content of 1.18 percent w.

Polymer XIX:

A copper-pyridine complex was prepared by treating a mixture of 2.5 g cuprous chloride, 175 ml pyridine and 300 ml nitrobenzene with oxygen at 20°C for 30 minutes with stirring. To the catalyst solution thus obtained a solution of 46 g 2,6-dimethylphenol, 125 g 2-methyl-6-hexadecylphenol and 50 g 2-methyl-6-(1-methyl-9-butoxycarbonylnonyl)phenol (molar ratio 1:1:0.4) in 380 g toluene was added at 30°-32° C over a period of 1.5 hours with stirring in an oxygen medium. The mixture was stirred at 20° C for a further 22 hours in the oxygen medium and then poured into methanol acidified with hydrochloric acid. The precipitated polymer was taken up in isooctane and the solution washed successively with dilute hydrochloric acid and dilute ammonia. The isooctane solution was dialysed through a rubber membrane for 24 hours, and the residue evaporated and taken up in benzene. After precipitation of the polymer with methanol and air-drying of the precipitate, 200 g of a terpolymer of 2,6-dimethyphenol, 2-methyl-6-hexadecylphenol and 2-methyl-6-(1-methyl-9-butoxycarbonylnonyl) phenol was obtained, having a molecular weight $\overline{M}_n = 35,500$.

To 76 g of this terpolymer in 460 g benzene fifteen grams of N,N-dimethyl-1,3-diaminopropane in 70 g decalin were added under nitrogen. The mixture was heated to 180° C, the benzene being distilled off. Subsequently seven grams of N,N-dimethyl-1,3-diaminopropane in 13 g decalin were added to the mixture, which was kept at 180°-190° C for 18 hours with reflux. The mixture was taken up in 1 liter of benzene and filtered, whereupon the polymer was isolated by precipitating twice in methanol. Product: 62 g polymer with a molecular weight $\overline{M}_n = 23,000$ and a nitrogen content of 1.17 percent w.

Polymer XX:

A copper-pyridine complex was prepared by treating a mixture of 3.0 g cuprous chloride, 840 ml pyridine and 300 ml toluene with oxygen at 20° C for 30 minutes with stirring. To the catalyst solution thus obtained a solution of 285 g 2,6-dimethylphenol and 780 g 2-methyl-6-hexadecylphenol (molar ratio 1:1) in 1650 ml toluene was added at 30°-32° C over a period of 1.5 hours with stirring in an oxygen medium. The mixture was stirred at 20° C for a further 22 hours in the oxygen medium and then washed out successively with dilute hydrochloric acid and dilute ammonia. After precipitation with methanol a copolymer of 2,6-dimethylphenol and 2-methyl-6-hexadecylphenol was obtained, having a molecular weight $\overline{M}_n = 23,700$.

To a solution of 78 g of this polymer in 570 g carbon tetrachloride 18.8 g of $SO_2Cl_2$ and 100 milligrams of azoisobutyronitrile were added. The mixture was kept at 50° C for 1.5 hours. Then a further 100 milligrams of azoisobutyronitrile were added and the mixture was kept at 65° C for 4 more hours. After precipitation with methanol a chlorine-containing polymer with a chlorine content of 6.8 percent w was obtained.

A solution of 100 g tetraethylenepentamine in 50 ml xylene and 30 g potassium carbonate were added to the aforesaid chlorine-containing polymer in 100 g xylene. The mixture was heated at 165° C for 4.5 hours under nitrogen, and subsequently diluted with xylene and filtered. The polymer was isolated by precipitation in methanol. Product: 78 g polymer with a nitrogen content of 1.95 percent w and a chlorine content of 3.8 percent w.

Polymer XXI:

A copper-pyridine complex was prepared by treating a mixture of 1.0 g cuprous chloride, 70 ml pyridine and 50 ml nitrobenzene with oxygen at 20° C for 30 minutes with stirring. To the catalyst solution thus obtained a solution of 12.2 g 2,6-dimethylphenol, 33.2 g 2-methyl-6-hexadecylphenol, 2.22 g 2,6-dimethyl-4-butoxycarbonylphenol (molar ratio 1:1:0.2) in 80 ml nitrobenzene was added in an oxygen medium in 210 minutes at 30° C. After this period stirring in the oxygen medium was continued for another 20 hours. The reaction mixture was poured in 3 ml methanol, after which the precipitated polymer was dissolved in isooctane. The idooctane solution was dialysed for 48 hours through a rubber membrane. The isooctane was evaporated and the polymer taken up in toluene. After precipitation of the polymer in methanol, 24.7 g of a terpolymer was obtained with a molecular weight $\overline{M}_n = 30,000$.

To 20 g of this polymer in 50 ml toluene, 5 g N,N-dimethyl-propane-1,3-diamine was added and the well-stirred mixture was boiled for 20 hours. The polymer was isolated by precipiation in methanol. The precipitation was repeated four times. Finally, the polymer was air-dired. Product: a polymer with a molecular weight $\overline{M}_n = 25,500$ and a nitrogen content of 0.30 percent w.

Polymer XXII:

A copolymer of 2,6-dimethylphenol and 2-methyl-6-hexadecylphenol (molar ratio 1:1) with a molecular weight $\overline{M}_n = 16,800$ was prepared in a way substantially the same as described hereinbefore under Polymer XX.

180 g of this copolymer in toluene was added under nitrogen with stirring to a solution of 51 g of tetraethylenepentamine in 700 ml of xylene. After the toluene had been distilled off, the mixture was kept at 140°–150° C for 17 hours. After dilution with an equal volume of isooctane the mixture was washed with water. The solution was evaporated and the polymer taken up in toluene. The polymer was isolated by precipitation in methanol, the precipitation being repeated twice. Product: 169 g polymer with a molecular weight $\overline{M}_n = 27,500$ and a nitrogen content of 0.32 percent w.

Polymer XXIII:

A copper-pyridine complex was prepared by treating a mixture of 4.0 g cuprous chloride, 375 ml pyridine and 100 ml toluene with oxygen at 20° C for 30 minutes with stirring. To the catalyst solution thus obtained a solution of 390 g 2-methyl-6-octylphenol in 600 ml toluene was added over a period of 5 hours with stirring in an oxygen medium. The mixture was stirred at 20° C for a further 40 hours in th oxygen medium. After dilution with an equal volume of isooctane the mixture was washed successively with water, dilute hydrochloric acid and again with water. The isooctane solution was dialysed through a rubber membrane for 48 hours, the residue evaporated and taken up in toluene. After precipitation of the polymer in methanol and air-drying of the precipitate, 314 g of a homopolymer of 2-methyl-6-octyl-phenol was obtained, having a molecular weight $\overline{M}_n = 13,500$.

194 g of this homopolymer in 750 ml toluene was added under nitrogen with stirring to a solution of 60 g tetraethylenepentamine in 300 g decalin, which had been brought to 80°C. After the toluene had been distilled off, the mixture was kept at 190° C for 3½ hours. After cooling and dilution with isooctane the solution was dialysed through a rubber membrane with a mixture of isooctane and 5 percent w n-butanol for 40 hours. The residue was evaporated and taken up in toluene. The polymer was precipitated in methanol and air-dried. Product: 174 g polymer with a molecular weight $\overline{M}_n = 14,200$ and a nitrogen content of 0.26 percent w.

Polymer XXIV:

A copolymer of 2,6-dimethylphenol and 2-methyl-6-hexadecylphenol (molar ratio 1:1) with a molecular weight $\overline{M}_n = 16,000$ was prepared in a way substantially the same as described hereinbefore under Polymer XX.

215 g of this copolymer in 700 g toluene was reacted with 14.0 g maleic anhydride for 5 hours in an autoclave at 200° C. After cooling the reaction mixture was washed with water. After precipitation in methanol a copolymer was obtained containing carboxylic anhydride groups. The copolymer had a colecular weight $\overline{M}_n = 19,100$.

195 g of this copolymer in toluene was added under nitrogen with stirring to a solution of 25 g tetraethylenepentamine in 700 g decalin which had been brought to 60° C. After the toluene had been distilled off, the mixture was kept at 192° C for 2 hours. The polymer was isolated by precipitation in methanol, the precipitation being repeated twice. Finally, the polymer was air-dried. Product: 200 g polymer with a molecular weight $\overline{M}_n = 22,700$ and a nitrogen content of 1.03 percent w.

The thermal stabilities of six of these polymers are given in Table I. The thermal stabilities were determined in air at a warming-up velocity of 3° C per minute. The values $T_{10}$, $T_{20}$ and $T_{50}$ are the temperatures in ° C at which 10, 20 and 50 percent loss in weight of the sample occurs, respectively.

Table I

| Polymer | $T_{10}$ | $T_{20}$ | $T_{50}$ |
|---|---|---|---|
| I | 405 | 420 | 455 |
| II | 425 | 440 | 470 |
| IV | 390 | 405 | 420 |
| XI | 380 | 400 | 420 |
| XVII | 390 | 410 | 425 |
| XIX | 385 | 405 | 425 |

In order to trace their behavior as dispersants, a peptization test was carried out with eighteen of these polymers. This test consists in determining the lowest concentration of additive which is still capable of keeping 0.015 percent w of carbon black in mineral oil in suspension for a period of 15 minutes at 250° C. The results of these peptization tests are given in Table II.

Table II

| Polymer | Result of Peptization Test | Polymer | Result of Peptization Test |
|---|---|---|---|
| I | 0.001–0.003 | XIV | 0.035 |
| III | 0.002–0.004 | XVI | 0.008–0.012 |
| IV | 0.001–0.003 | XVII | 0.002 |
| V | 0.002–0.005 | XVIII | 0.002 |
| VI | 0.003 | XIX | 0.002 |
| VII | 0.004–0.006 | XX | 0.002 |
| IX | 0.003 | XXII | 0.003 |
| XI | 0.001–0.003 | XXIII | 0.004 |
| XII | 0.003–0.010 | XXIV | 0.002 |

The viscometric properties of Polymer I in a mineral lubricating oil are given in Table III.

Table III

|  | $V_k$ 100°F cs | $V_k$ 210°F cs | VI | VT |
| --- | --- | --- | --- | --- |
| Base Oil | 60.3 | 7.63 | 98 | — |
| Base Oil + 1% Polymer I | 66.5 | 8.45 | 106 | 105 |
| Base Oil + 2% Polymer I | — | 9.75 | — | — |
| Base Oil + 4% Polymer I | — | 13.31 | — | — |

The viscometric properties of seven polymers according to the invention are given in Table IV.

Table IV

|  | $V_k$ 100°F cs | $V_k$ 210°F cs | VI | VT |
| --- | --- | --- | --- | --- |
| Base oil | 58.0 | 7.37 | 96 | — |
| Base oil + 1.5%w Polymer III | 75.2 | 9.39 | 111 | — |
| Base oil + 1%w Polymer IV | 65.0 | 8.49 | 110 | 126 |
| Base oil + 1.5%w Polymer V | 70.1 | 8.76 | 107 | — |
| Base oil + 1.5%w Polymer XII | 68.0 | 8.54 | 106 | — |
| Base oil + 1.5%w Polymer XVII | 70.7 | 8.92 | 110 | — |
| Base oil + 1.5%w Polymer XVIII | 75.6 | 9.46 | 112 | — |
| Base oil + 1.5%w Polymer XIX | 70.0 | 9.05 | 114 | — |

The intrinsic viscosities of four polymers according to the invention were determined at 25° C in decaline. The results are given in Table V.

Table V

| Polymer | Intrinsic Viscosity dl/g |
| --- | --- |
| III | 0.35 |
| VI | 0.34 |
| VII | 0.25 |
| XII | 0.17 |

The performance of the present polymers as additives to lubricating oils was determined with the aid of a series of motor tests. The polymers tested and the results obtained are summarized in Table VI. Descriptions of the tests conducted are given below.

LABECO CLR ENGINE

Single-cylinder, four-stroke, water-cooled gasoline engine, bore 96.3 mm, stroke 95.2 mm, compression ratio 8.9. Test Conditions: The test was carried out under varying conditions, namely, alternately 1½ min. at 2,000 rpm, 8 hp load and a mixture strength of 1.0, and ½ min. at 1,600 rpm, 5 hp load and a mixture strength of 1.7. The cylinder cooling temperature was 90° C, the oil temperature was about 85° C. The quantity of lubricating oil tested amounted to 1,500 g. The fuel was a leaded gasoline with a sulfur content of 0.1 percent w. Duration of the Test: 68 hours. In this test, both the piston cleanliness and the sludge formation in the engine are measured.

FIAT-1,500 ENGINE

Four-cylinder, four-stroke, water-cooled gasoline engine, bore 77 mm, stroke 79.5 mm, compression ratio 8.8. Test Conditions: Speed 3,600 rpm; load 34.2 hp; mixture strength about 1.0. The cylinder cooling temperature was 85° C, the oil temperature was about 100° C. The quantity of lubricating oil tested amounted to 3,500 g. The fuel was a premium gasoline. Duration of the test 35 hours. In this test the piston cleanliness is measured.

PETTER AV-1 LAB MOTOR

Single-cylinder, liquid-cooled diesel engine with indirect injection, bore 88 mm, stroke 110 mm, compression ratio 19. Test Conditions: Speed 1,500 rpm; load 5 hp. The cylinder cooling liquid was kerosene, the cylinder cooling liquid temperature was 85° C, the oil temperature was about 85° C. The quantity of lubricating oil tested amounted to 2,500 g. The fuel was a gas oil with 0.4 percent w sulfur. Duration of the tests was 17 and 34 hours, respectively. In this test the piston cleanliness is measured.

Table VI

|  | Piston Cleanliness[a] | Sludge[a] |
| --- | --- | --- |
| CLR-Gasoline Engine |  |  |
| Base oil | 4.4 | 6.5 |
| Base oil + 1%w Polymer I | 5.3 | 8.3 |
| Base oil | 3.9 | 6.5 |
| Base oil + 1.5%w Polymer III | 5.3 | 9.0 |
| Base oil | 4.0 | 6.4 |
| Base oil + 1.5%w Polymer IV | 6.1 | 9.1 |
| Fiat-Gasoline Engine |  |  |
| Base oil | 5.3 |  |
| Base oil + 1%w Polymer I | 6.1 |  |
| Base oil | 5.7 |  |
| Base oil + 1.5%w Polymer III | 7.0 |  |
| Base oil | 5.9 |  |
| Base oil + 1.5%w Polymer IV | 6.7 |  |
| Base oil | 5.9 |  |
| Base oil + 1.5%w Polymer V | 6.3 |  |
| Base oil | 5.4 |  |
| Base oil + 1.5%w Polymer VI | 6.6 |  |
| Base oil | 5.3 |  |
| Base oil + 1.5%w Polymer IX | 6.4 |  |
| Base oil | 5.4 |  |
| Base oil + 1.5%w Polymer XII | 6.0 |  |
| Petter AV-1 Diesel Engine | After 17 Hours | After 34 Hours |
| Base oil | 4.0 | — |
| Base oil + 1%w Polymer I | 8.0 | 7.0 |

[a] 10 = clean.

These tests clearly show the advantages of incorporating the polymers of this invention into lubricants to obtain superior piston cleanliness and inhibit sludge formation.

In order to further deomonstrate the remarkable effectiveness of the present polymers as lube oil additives, a number of the poly-nitrogen containing polymers were compared to a commercial polymeric nitrogen-containing dispersant (70 percent reaction product of polyisobutene, maleic anhydride and tetraethylenepentamine). The base oil used in these tests was a paraffinic lubricating oil. The compositions tested and the results obtained are shown in Table VII.

Table VII

|  | Piston Cleanliness[a] | Sludge[a] |
|---|---|---|
| CLR-Gasoline Engine | | |
| Base oil | 4.05 | 5.65[b] |
| Base oil + 2.0%w commercial dispersant | 4.9[b] | 8.75[b] |
| Base oil + 1.5%w Polymer XVIII | 7.0 | 9.8 |
| Base oil + 1.5%w Polymer XXIV | 7.0 | 9.7 |

|  | Piston Cleanliness[a] | |
|---|---|---|
|  | After 35 Hours | After 70 hours |
| Fiat-Gasoline Engine | | |
| Base oil | 5.0[c] | — |
| Base oil + 2.0%w commercial dispersant | 6.7[c] | 5.3[c] |
| Base oil + 1.5%w Polymer XVIII | 8.0 | 6.8 |
| Base oil + 1.5%w Polymer XIX | 7.2 | 6.3 |
| Base oil + 1.5%w Polymer XX | 7.6 | 6.7 |
| Base oil + 1.5%w Polymer XXIV | 7.0 | 5.8 |

[a] 10 = clean.
[b] Average of two test runs.
[c] Average of four test runs.

I claim as my invention:

1. A linear poly(para-dialkyl phenylene)-polyether, having at least ten para phenylene groups and a molecular weight of 5,000 to 100,000, and selected from the group consisting of a homopolymer of 2-methyl-6-hexadecyl phenol, a copolymer of 2,6-dimethyl phenol and 2-methyl-6-hexadecyl phenol, a copolymer of 2,6-dimethyl phenol and 2-methyl-6-($C_{22}$-$C_{28}$) alkyl phenol and a copolymer of 2,6-dimethyl phenol and 2-methyl-6-($C_{14}$-$C_{18}$) alkyl phenol.

2. A linear polymer according to claim 1 wherein the polymer is a copolymer of 2,6-dimethyl phenol and 2-methyl-6-hexadecyl phenol.

3. A linear polymer according to claim 1 wherein the polymer is a copolymer of 2,6-dimethyl phenol and 2-methyl-6-($C_{22}$-$C_{28}$) alkyl phenol.

4. A linear polymer according to claim 1 wherein the polymer is a copolymer of 2,6-dimethyl phenol and 2-methyl-6-($C_{14}$-$C_{18}$) alkyl phenol.

5. A linear polymer according to claim 1 wherein the polymer is a homopolymer of 2-methyl-6-hexadecyl phenol.

* * * * *